(No Model.)
W. F. SHUEY.
CUTTING MECHANISM FOR MOWING MACHINES.
No. 450,499. Patented Apr. 14, 1891.
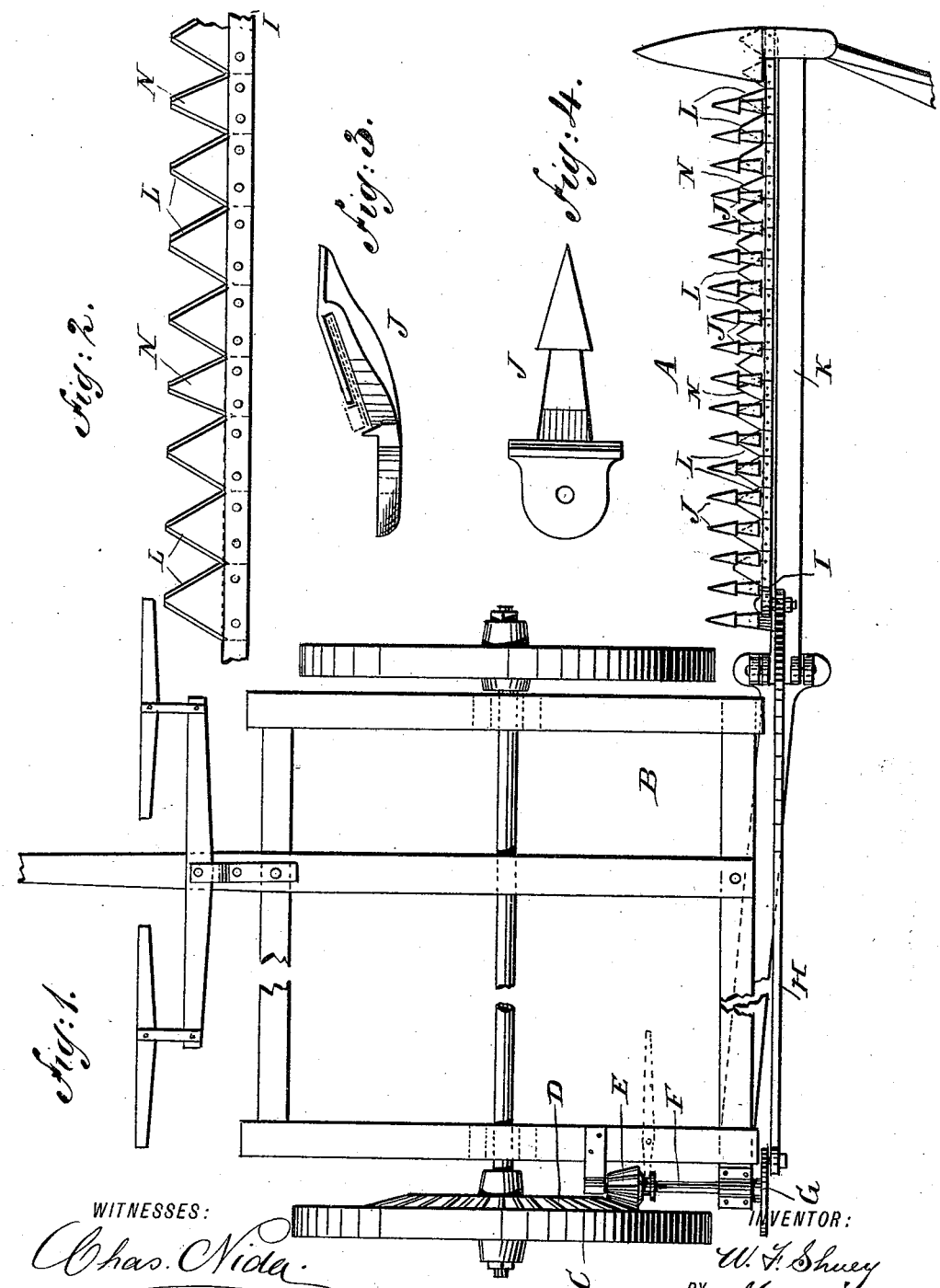
WITNESSES:
Chas. Nida
C. Sedgwick
INVENTOR:
W. F. Shuey
BY Munn & Co.
ATTORNEYS

UNITED STATES PATENT OFFICE.

WILLIAM FRANK SHUEY, OF SWOOPE, VIRGINIA.

CUTTING MECHANISM FOR MOWING-MACHINES.

SPECIFICATION forming part of Letters Patent No. 450,499, dated April 14, 1891.

Application filed September 23, 1890. Serial No. 365,889. (No model.)

*To all whom it may concern:*

Be it known that I, WILLIAM FRANK SHUEY, of Swoope, in the county of Augusta and State of Virginia, have invented a new and Improved Cutting Mechanism for Mowing-Machines, of which the following is a full, clear, and exact description.

The object of the invention is to provide a new and improved cutting mechanism for mowing and similar machines, which is simple and durable in construction, reduces the motive power for operating it to a minimum, prevents choking of the knives, and renders backing up for a start on heavy grass unnecessary, as the several knives cut alternately.

The invention consists of a cutter-bar provided with knives passing through guards and arranged in divisions, each having a number of equal-sized knives, two adjacent divisions or sections being separated by a knife of a different size from those contained in the division or section.

The invention also consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1 is a plan view of the improvement as applied. Fig. 2 is an enlarged plan view of part of the mowing-knife. Fig. 3 is a side elevation of one of the guards or fingers, and Fig. 4 is a plan view of the same.

The improved cutting mechanism A is attached to the frame B and driven by suitable mechanism from the driving wheel or wheels supporting the frame. As shown in the drawings, one of the driving-wheels C is provided with the bevel gear-wheel D, meshing into a pinion E, secured on a longitudinally-extending shaft F, mounted to turn in suitable bearings in the frame of the mowing-machine B. On the shaft F is secured a crank-disk G, pivotally connected with the pitman H, pivoted to the cutter-bar I, fitted to slide transversely in bearings in the guards or fingers J, fastened in the usual manner to the finger-bar K. The cutter-bar I is provided on its under side with knives arranged in divisions or sections L, the several divisions or sections containing each an equal number of equal-sized knives, two adjacent divisions or sections being separated from each other by a knife N, somewhat larger or smaller in size than the knives contained in the several divisions. The guards or fingers J are inclined upwardly, as plainly illustrated in Fig. 3, the knives on the cutter-bar I being similarly inclined, so as to cut the stems of grass diagonally instead of straight, as is usually done in cutting mechanisms now constructed. The guards or fingers J are equally spaced and all of the same size, so that when the machine is set in motion and a reciprocating motion is imparted to the cutter-bar I the several divisions of knives L cut alternately, owing to the intervening narrower or wider knives N. When the first division of knives L has finished cutting, the second division begins, and when this division is through the third division commences, and when through then the first one commences, and so on. Thus the cutting off always takes place through but one-third of the stroke of the cutter-bar, while in cutting mechanisms as heretofore constructed the cutting takes place throughout the stroke. It is understood that this alternate cutting of the several divisions takes place at both the inner and outer strokes of the cutter-bar I. It will be seen that in this manner the power for operating the cutter-bar is reduced considerably, and less parts are required for establishing connection between the cutter-bar and the driving-wheel C, as a longer stroke can now be imparted to the cutter-bar, thus requiring less gear-wheels or other devices for imparting a reciprocating motion to the cutter-bar I from the revolving driving-wheel C.

As shown in Fig. 1, the knives are arranged in three divisions L by introducing two larger or smaller knives N; but the same effect may be obtained by using equal-sized knives throughout the cutter-bar and using larger or smaller fingers or guards J between two adjacent divisions or sections of fingers or guards.

Having thus described my invention, I claim as new and desire to secure by Letters Patent—

1. In a cutting mechanism for mowing-machines, the combination, with equally spaced and sized guards or fingers, of a reciprocating cutter-bar and knives held on the said cutter-bar and arranged in divisions, each having a number of knives of equal size, two adjacent divisions being separated by a knife of different size from those contained in the divisions, substantially as shown and described.

2. In a cutting mechanism for mowing-machines, the combination, with equally sized and spaced guards inclined upwardly, of a cutter-bar fitted to slide in the said fingers or guards and provided with knives inclined correspondingly with the fingers or guards, the said knives being arranged in divisions, each having a number of knives of equal size, two adjacent divisions being separated by a knife of a different size from those contained in the divisions, substantially as shown and described.

WILLIAM FRANK SHUEY.

Witnesses:
A. H. SHUEY,
M. P. FUNKHOUSER.